United States Patent
Venkataramaiah et al.

(10) Patent No.: US 10,191,757 B2
(45) Date of Patent: Jan. 29, 2019

(54) SEAMLESS ADDRESS REASSIGNMENT VIA MULTI-TENANT LINKAGE

(71) Applicant: MICROSOFT TECHNOLOGY LICENSING, LLC, Redmind, WA (US)

(72) Inventors: Narasimhan Agrahara Venkataramaiah, Redmond, WA (US); Deepak Bansal, Redmond, WA (US); Daniel Christopher Eckert, Bellevue, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

(21) Appl. No.: 14/752,069

(22) Filed: Jun. 26, 2015

(65) Prior Publication Data
US 2016/0378526 A1    Dec. 29, 2016

(51) Int. Cl.
G06F 9/455 (2018.01)
G06F 9/50 (2006.01)

(52) U.S. Cl.
CPC .......... *G06F 9/45558* (2013.01); *G06F 9/505* (2013.01); *G06F 2009/4557* (2013.01); *G06F 2009/45595* (2013.01)

(58) Field of Classification Search
CPC ................. G06F 9/45558; G06F 9/505; G06F 2009/4557; G06F 2009/45595
See application file for complete search history.

(56) References Cited

U.S. PATENT DOCUMENTS

| | | | |
|---|---|---|---|
| 6,308,216 B1 * | 10/2001 | Goldszmidt | H04L 12/2856 709/224 |
| 7,567,504 B2 | 7/2009 | Darling et al. | |
| 7,587,399 B2 * | 9/2009 | Kilian | H04L 67/02 |
| 7,751,391 B2 | 7/2010 | Boden et al. | |
| 8,010,993 B1 * | 8/2011 | Bartholomay | H04L 63/10 726/1 |
| 8,416,692 B2 | 4/2013 | Patel et al. | |
| 8,805,990 B2 | 8/2014 | Murthy et al. | |
| 2009/0222559 A1 | 9/2009 | Anipko et al. | |
| 2009/0307334 A1 | 12/2009 | Maltz et al. | |
| 2011/0145390 A1 | 6/2011 | Kakadia et al. | |

(Continued)

OTHER PUBLICATIONS

Patel et al. Ananta: Cloud Scale Load Balancing. [online] (Aug. 16, 2013). ACM., pp. 207-218. Retrieved From the Internet <https://www.eecs.umich.edu/courses/eecs589/papers/ananta.pdf>.*

(Continued)

*Primary Examiner* — Emerson C Puente
*Assistant Examiner* — Jonathan R Labud
(74) *Attorney, Agent, or Firm* — Shook, Hardy & Bacon L.L.P (57) ABSTRACT

The technology described herein manages the deployment of a group of machines from a staged state to a production state, while maintaining both the production and staged machines behind a single virtual internet protocol (VIP) address. The machines may be deployed within one or more data centers. Requests for service addressed to the VIP can be sent by a load balancer to machines within a staged pool or a production pool. The load balancer can evaluate characteristics of the request against a policy to determine whether to communicate the request to a machine in the first or second pool.

20 Claims, 6 Drawing Sheets

(56) References Cited

U.S. PATENT DOCUMENTS

| | | | |
|---|---|---|---|
| 2011/0320821 A1 | 12/2011 | Alkhatib et al. | |
| 2012/0331127 A1* | 12/2012 | Wang | G06F 9/5083 709/224 |
| 2013/0007505 A1* | 1/2013 | Spear | G06F 11/2025 714/4.11 |
| 2013/0111260 A1* | 5/2013 | Reddy | G06F 11/2041 714/4.11 |
| 2013/0159487 A1 | 6/2013 | Patel et al. | |
| 2013/0339505 A1 | 12/2013 | Bansal et al. | |
| 2013/0343399 A1 | 12/2013 | Kandula et al. | |
| 2014/0098814 A1 | 4/2014 | Bansal et al. | |
| 2015/0106805 A1* | 4/2015 | Melander | G06F 9/45537 718/1 |
| 2016/0371071 A1* | 12/2016 | Reese | G06F 8/65 |

OTHER PUBLICATIONS

Matskas, Christos. Azure Web Apps—Testing in Production. [online] (Jan. 30, 2015)., pp. 1-13. Retrieved From the Internet <https://cmatskas.com/azure-websites-testing-in-production/> (Year: 2015).*

"International Preliminary Report on Patentability Issued in PCT Application No. PCT/US2016/039130", dated Sep. 27, 2017, 9 Pages.

"Second Written Opinion Issued in PCT Application No. PCT/US2016/039130", dated May 18, 2017, 8 Pages.

"International Search Report and Written Opinion Issued in PCT Application No. PCT/US2016/039130", dated Sep. 27, 2016, 13 Pages.

Amit, "Azure Web APPS (Websites) Deployment Slots—Explained", Retrieved From <<http://blog.amitapple.com/post/2014/11/azure-websites-slots/#.WC6Up02QrxO>>, Nov. 17, 2014, 6 Pages.

Hollander, Tom, "A/B Testing with Azure Websites", Retrieved From <<https://blogs.msdn.microsoft.com/tomholl/2014/11/09/ab-testing-with-azure-websites/>>, Nov. 9, 2014, 7 Pages.

MacKenzie, Neil, "VIPs, DIPs and PIPs in Microsoft Azure", Retrieved From <<https://blogs.msdn.microsoft.com/cloud_solution_architect/2014/11/08/vips-dips-and-pips-in-microsoft-azure/>>, Nov. 8, 2014, 2 Pages.

"Manage Deployments in Azure", Retrieved on: Dec. 16, 2014, Available at: http://msdn.microsoft.com/en-us/library/azure/gg433027.aspx.

Pirsig, Robert M., "Re-Deploying your Windows Azure Service without Incurring Downtime", Published on: Jun. 6, 2010, Available at: http://blog.toddysm.com/2010/06/re-deploying-your-windows-azure-service-without-incurring-downtime.html.

Patel, et al., "Ananta: Cloud Scale Load Balancing", In Proceedings of the ACM SIGCOMM Conference, Aug. 12, 2013, 12 pages.

Pirsig, Robert M., "Update, Upgrade and VIP-Swap for Windows Azure Service—What are the Differences?", Published on: Jun. 1, 2010, http://blog.toddysm.com/2010/06/update-upgrade-and-vip-swap-for-windows-azure-servicewhat-are-the-differences.html.

Xu, Shaun, "Plan to Minimize VIP Changes in Windows Azure", Published on: Jul. 5, 2013, Available at: http://geekswithblogs.net/shaunxu/archive/2013/07/05/plan-to-minimize-vip-changes-in-windows-azure.aspx.

Chou, Yung, "Windows Azure Infrastructure Services IP Address Management (Part 1 of 2)", Published on: Mar. 17, 2014, https://blogs.technet.microsoft.com/yungchou/2014/03/17/windows-azure-infrastructure-services-ip-address-management-part-1-of-2/.

"Concepts & Examples ScreenOS Reference Guide—Address Translation", Published on: Dec. 10, 2012, Available at: http://www.juniper.net/techpubs/software/screenos/screenos6.3.0/630_ce_AddressTranslation.pdf.

* cited by examiner

SEAMLESS ADDRESS REASSIGNMENT VIA MULTI-TENANT LINKAGE

BACKGROUND

Load-balancing systems typically expose multiple direct endpoints of a service as a single virtual endpoint to the consumers of the service. The incoming traffic resulting from consumers of the service are distributed in a rotation or are "load-balanced" amongst a set of machines that are ready to provide the service at any particular moment in time. The set of machines designated to provide service are in production mode. In addition to machines that are actively providing the service, a group of machines may be in a staged deployment. The machines in the staged deployment may be running an updated version of the service that needs to be tested prior to production deployment. Once tested, the staged machines may be promoted to a production state and the production deployment may be taken offline and the machines associated with the original deployment are reallocated for a different purpose.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein manages the deployment of a group of machines from a staged state to a production state, while maintaining both the production and staged machines behind a single virtual internet protocol (VIP) address. The machines may be deployed within one or more data centers. Requests for service addressed to the VIP can be sent by a load balancer to machines within a staged pool or a production pool. The load balancer can evaluate characteristics of the request against a policy to determine whether to communicate the request to a machine in the first or second pool.

BRIEF DESCRIPTION OF THE DRAWINGS

The aspects described herein are described in detail below with reference to the attached drawing figures, wherein.

DETAILED DESCRIPTION

The technology described herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein manages the deployment of a group of machines from a staged state to a production state, while maintaining both the production and staged machines behind a single virtual internet protocol (VIP) address. The machines may be deployed within one or more data centers. Requests for service addressed to the VIP can be sent by a load balancer to machines within a staged pool or a production pool. The load balancer can evaluate characteristics of the request against a policy to determine whether to communicate the request to a machine in the first or second pool.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, aspects described herein are described with reference to a load balanced operating environment supported by a cloud computing platform, the load balanced operating environment includes one or more endpoints of a service (herein also referred to as Direct IPs or DIPs) as a single virtual endpoint (herein also referred to as Virtual IPs or VIPs) to the consumers of the service. Components can be configured for performing novel aspects of different aspects, where "configured for" comprises programmed to perform particular tasks or implement particular abstract data types using code. It is contemplated that methods described herein can be performed in different types of operating environments having alternate configurations of the functional components described herein. As such, the aspects described herein are merely exemplary, and it is contemplated that the techniques described may be extended to other implementation contexts.

Aspects described herein can be implemented on a cloud computing infrastructure that runs cloud applications and services across different data centers and geographic regions. The cloud computing infrastructure can implement a fabric controller component for provisioning and managing resource allocation, deployment/upgrade, and management of cloud applications and services. Typically, a cloud computing system acts to store data or run applications and services in a distributed manner. The application and service components of the cloud computing infrastructure may include nodes (e.g., computing devices, processing units, or blades in a server rack) that are allocated to run one or more portions of applications and services.

When multiple applications and services are being supported by the nodes, the nodes may be partitioned into virtual machines or physical machines that concurrently run the separate service applications, respectively, in individualized computing environments that support the resources and/or operating system specific to each service application. Further, each application or service may be divided into functional portions such that each functional portion is able to run on a separate virtual machine. In cloud computing infrastructures, multiple servers may be used to run the applications and services to perform data storage operations in a cluster. In particular, the servers may perform data operations independently but exposed as a single device referred to as a cluster. Each server in the cluster may be referred to as a node. Applications and services are used interchangeably herein.

A cloud computing infrastructure can support different types of services, such as computing, storage, content delivery, networking, and security. When a service is being supported by a cloud computing infrastructure or cloud, the service includes a collection of virtual or native machines managed in combination with each other. Each machine can be assigned a private Direct IP (DIP) address, while the service is assigned one public Virtual IP (VIP) address. Traffic crossing the service boundary, e.g., to the Internet or to back-end services within the same data center such as storage, uses the VIP address. A service exposes zero or more external endpoints that each receives inbound traffic. It is contemplated that inbound traffic can be received using a specific protocol and port on the VIP.

In aspects of the technology described herein, a cloud computing infrastructure can support multiple versions of a single service. In one aspect, a first version of the service is in production and a second version of the service is staged. A staged version may be an upgraded version of the service ready for testing. In another aspect, the staged version has been tested and is ready for production service. Aspects of the technology described herein can help transition a service between a first and second version without disrupting the service.

A load balancer in a cloud computing infrastructure can be configured to distribute inbound traffic. In particular, traffic directed to an internal endpoint in the cloud computing infrastructure can be load-balanced through the VIP, or by a load-balancing component associated therewith, to DIPs of one or more machines of the service. Load-balancing distributes inbound traffic across the one or more machines to optimize resources, maximize throughput, minimize response time, and avoid overload of any single resource. Aspects of the technology described herein can locate two or more pools of machines behind a single DIP and allow the load balancer to select a pool and then direct traffic to a machine in the selected pool. The load balancer may select a pool based on a policy that assigns requests with certain characteristics to one of the pools.

Figure 1:
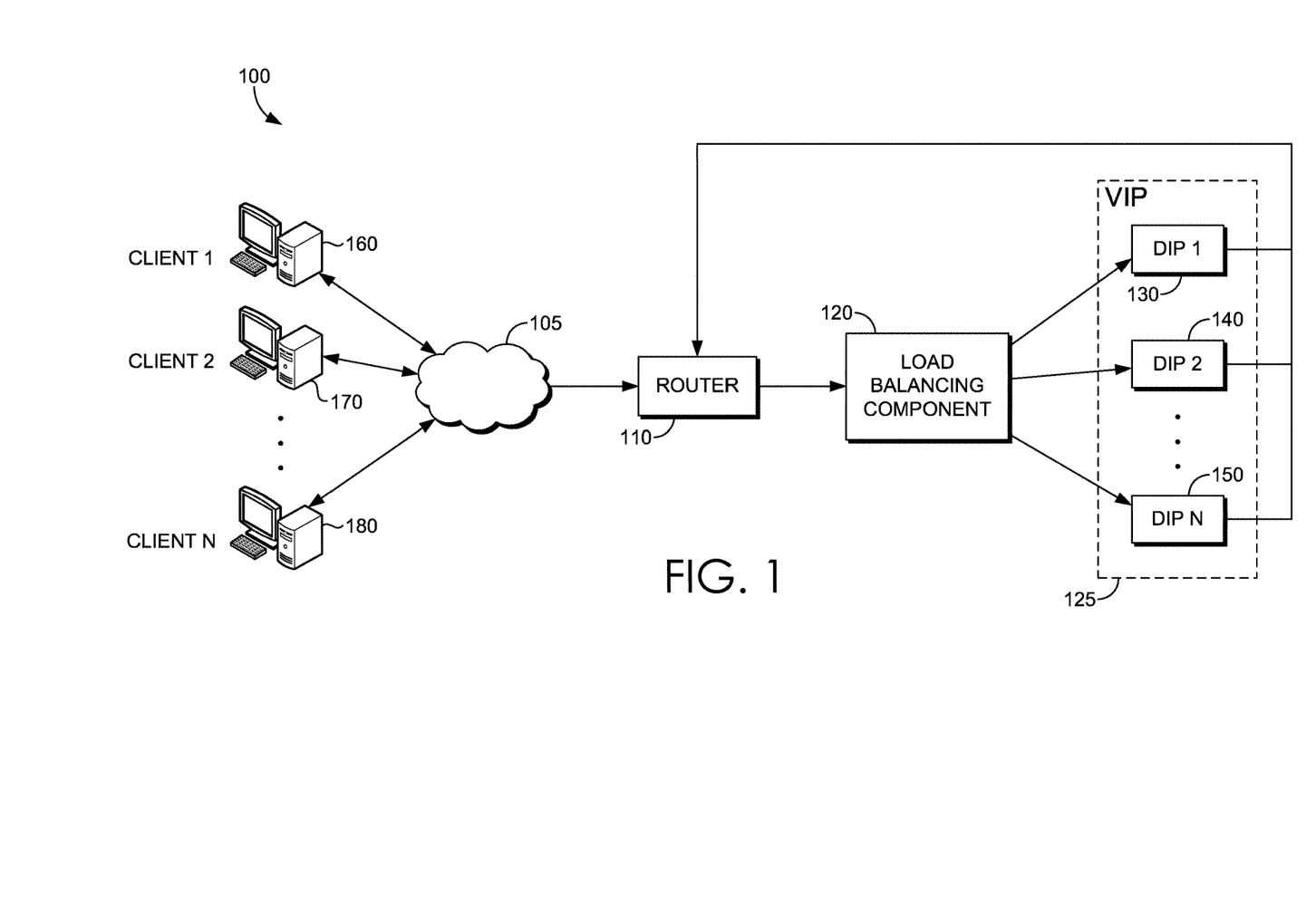
FIG. 1 is a block diagram of an exemplary operating environment in which aspects described herein may be employed.

Referring now to FIG. 1, FIG. 1 illustrates an exemplary cloud computing infrastructure 100 in which implementations of the present disclosure may be employed. In particular, FIG. 1 shows a high level architecture of the cloud computing infrastructure 100 in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the cloud computing infrastructure 100 includes a cloud computing platform 105 having at least one router 110, at least one load-balancing component 120 associated with at least one VIP 125, and DIP nodes 130, 140, and 150 associated with the at least one VIP 125. The DIP nodes may be embodied as virtual machines (VMs) residing in one or more host nodes (for example, grouped together within an exemplary host node associated with the at least one VIP 125), each host node comprising a host agent (not shown) for directing traffic to specific virtual machines based on its associated DIP address. The cloud computing platform 105 is configured to service clients 160, 170, and 180. Each node and client can reside on any type of computing device, which may correspond to computing device 700 described with reference to FIG. 7, for example. The components of the cloud computing infrastructure 100 may communicate with each other over a network, which may include, without limitation, one or more local area networks (LANs) and/or wide area networks (WANs). Any number of nodes (e.g., servers) and client computing devices may be employed within the cloud computing infrastructure 100 within the scope of implementations of the present disclosure.

In cloud computing infrastructure 100 supported by the cloud computing platform 105, the nodes, such as nodes 130, 140, and 150, are utilized to provide a service and may also store and provide access to data in the storage of cloud computing platform 105. The cloud computing platform 105 also may be a public cloud, a private cloud, or a dedicated cloud. The cloud computing platform 105 may include a data center configured to host and support operation of endpoints in a particular service application. The phrase "application" or "service" as used herein broadly refers to any software, or portions of software, that run on top of, or accesses storage locations within, the data center. In one aspect, one or more of the endpoints may represent the portions of software, component programs, or instances of roles that participate in the service application. Also, clients 160, 170, and 180 may be configured to access the data, run applications for accessing the data, or be linked into an application or a service supported by the cloud computing platform 105.

Having described various aspects of the cloud computing infrastructure 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure.

Figure 2:
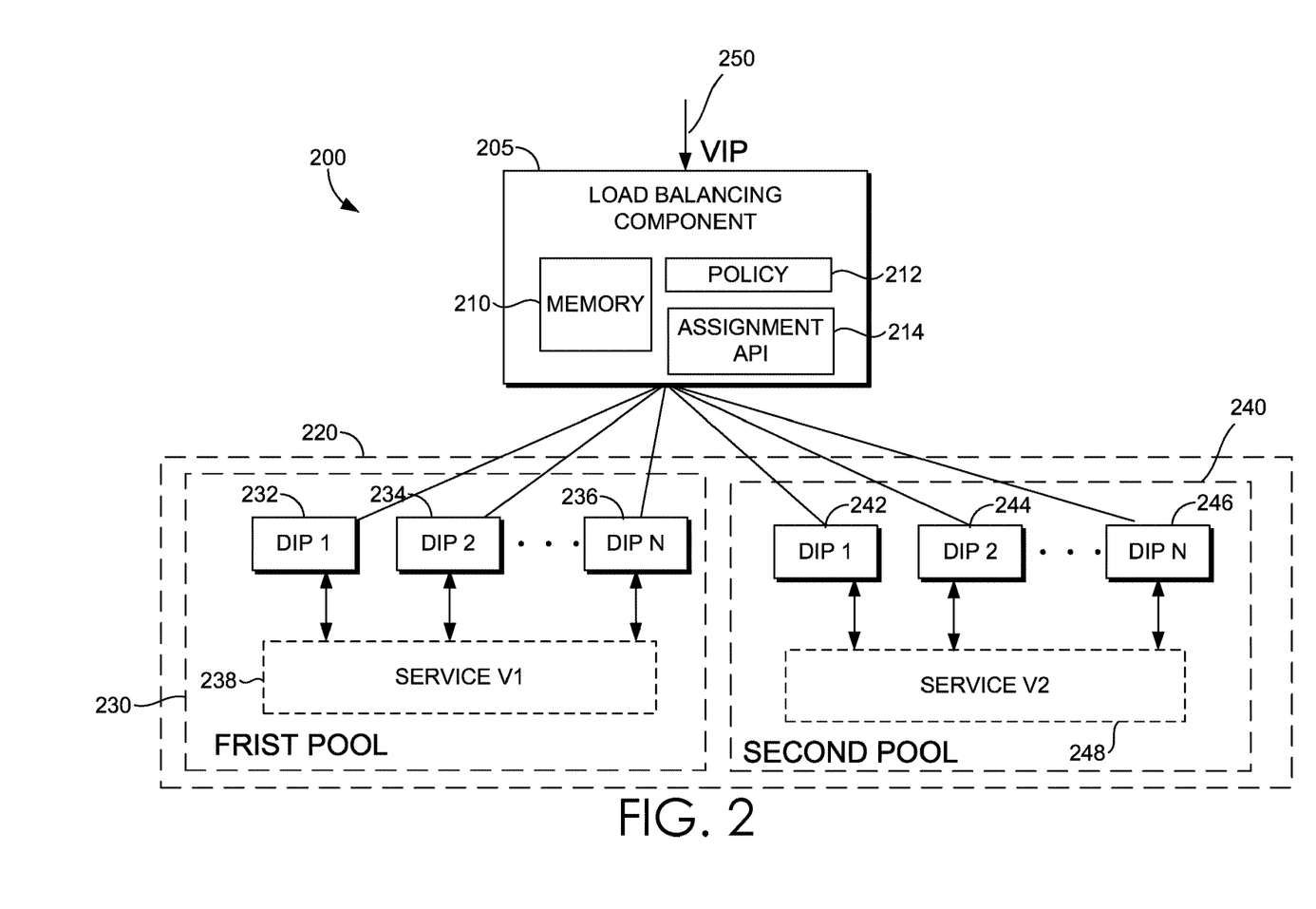
FIG. 2 is a schematic of an exemplary multi-pool framework, in accordance with aspects described herein.

With reference to FIG. 2, a load-balancing framework 200 of the cloud computing infrastructure is provided. The load-balancing framework 200 and functionality supported therein can be described by way of an exemplary operating environment. The load-balancing framework 200 can comprise a load-balancing component 205 that receives messages 250 addressed to a VIP. The load-balancing component 205 is configured to distribute traffic to either a first pool of machines 230 or a second pool of machines 240. In addition to distributing traffic between pools, the load-balancing component 205 may balance service requests across the DIP nodes within a pool, thereby preventing any particular DIP node from becoming a single point of failure, while also improving overall responsiveness of the service.

The technology described herein allows two different versions of a service 220 to be deployed simultaneously. One version may be a production version and the other a testing version. Both the first version of the service 238 and the second version of the service 248 may appear as a single service 220 to customers. In other words, customers may send a request for the service 220 and then be directed into one of the two available versions of the service by the load-balancing component 205. The service 220, also referred to herein as the "application," can be any software, or portions of software, that run on top of, or accesses storage locations within, the cloud computing infrastructure. It is contemplated that the service 220 is hosted individually and/or collectively by each DIP node. In some aspects, one or more of the DIP nodes may represent the portions of software, component programs, or instances of roles that participate in the service application.

The first pool of machines 230 provides a first version of a service 238, and the second pool of machines 240 provides a second version of a service 248. Both the first version of the service 238 and the second version of the service 248 are available simultaneously, meaning both service versions are available to serve a newly received customer request, and a decision needs to be taken to determine which service version (and corresponding machines) should handle the request.

Machines in the first pool 230 may be assigned a unique endpoint (herein also referred to as DIP nodes, Direct IPs, or DIPs). The machines in the first pool 230 are associated with a first DIP node 232, a second DIP node 234, and an Nth DIP node 236. Nth DIP node 236 indicates that a machine pool is not limited to a particular number of machines and associated DIP nodes. Machines in the second pool of machines 240 are associated with a first DIP node 242, a second DIP node 244, and an Nth DIP node 246. Nth DIP node 246 indicates that a machine pool is not limited to a particular number of machines and associated DIP nodes.

The DIP nodes 232, 234, 236, 242, 244, and 246 can be computing devices corresponding to computing device 700 described with reference to FIG. 7, or can be computing devices embodied as virtual machines (VMs), also corresponding to computing device 700, configured to operate in a virtual environment of one or more VM hosts further corresponding to computing device 700. In some configurations, the DIP nodes associated with a VIP can be in any configuration including any combination of virtual machines and/or computing devices. The DIP nodes 232, 234, 236, 242, 244, and 246 are in communication with their associated VIP over a network and are each configured to provide access to service 220 to clients (not shown) that request access to the service 220 through the VIP. The DIP nodes 232, 234, 236, 242, 244, and 246 can, individually or in combination, host one or more services within the cloud computing infrastructure.

Individual DIP nodes may be assigned to either the first pool of machines 230 or the second pool of machines 240 using the assignment API 214 provided by the load-balancing component 205. An administrator can access the assignment API 214 and register an individual machine with the load-balancing component 205. A record of a machine's association with one of multiple available pools may be stored in the load-balancing component's memory 210. The memory 210 may also store a routing policy 212. The routing policy 212 is executed by the load-balancing component 205 to determine to which of several available pools a request to the VIP should be routed.

The routing policy 212 can be based on request characteristics. Request characteristics can include client characteristics for the client with which the request originated. Client characteristics can include the class of client device, the manufacturer of the client device, the operating system of a client device, the operating system version of the client device, the geographic location of a client device, user information associated with the client device, and such. Requests from different types of clients can be routed to the different pools. For example, requests from mobile devices could be sent to a first pool while requests from laptops are sent to a second pool.

In one aspect, the routing policy 212 can enforce a flighting operation. A flighting operation sends a percentage of requests to a first version of the service and the remaining percentage to a second version. The flighting operation may be used for testing a new version of the service with a small percent of the customer requests received.

In another aspect, a request may be designated for testing. Policy can route testing requests to the pool providing a version of a service being tested.

In one aspect, the policy routes requests based on a rollout scenario. A rollout scenario replaces a first version of a service with a second version of the service. The second version of the service may have already been tested so the rollout scenario is distinct from the testing scenario. The rollout scenario replaces a first version of a service with a second version of the service while maintaining service continuity. Users may be connected to a first version of the service while new requests are sent to the second version of the service, with both versions of the service behind the same VIP. More machines providing the second version of the service can be brought online as the transition takes place.

Figure 3:
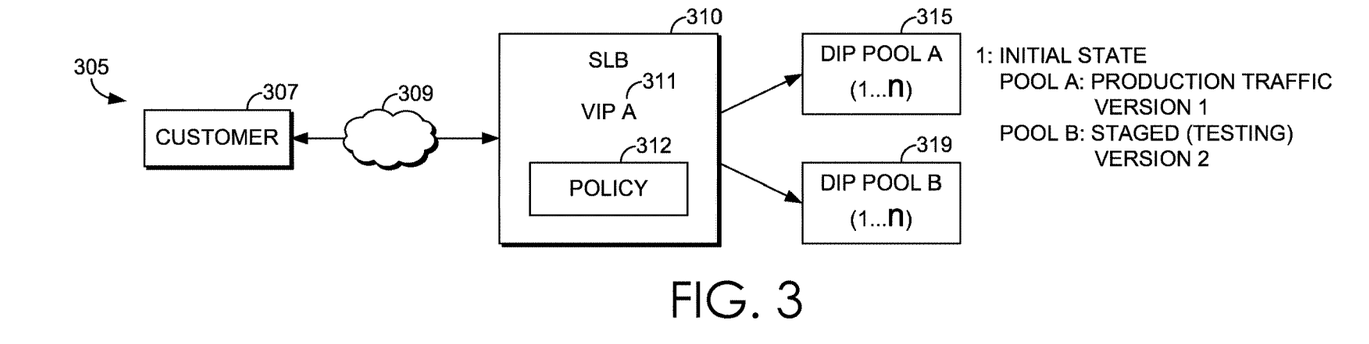
FIG. 3 is a schematic of an exemplary multi-pool framework, in accordance with aspects described herein.
Figure 4:
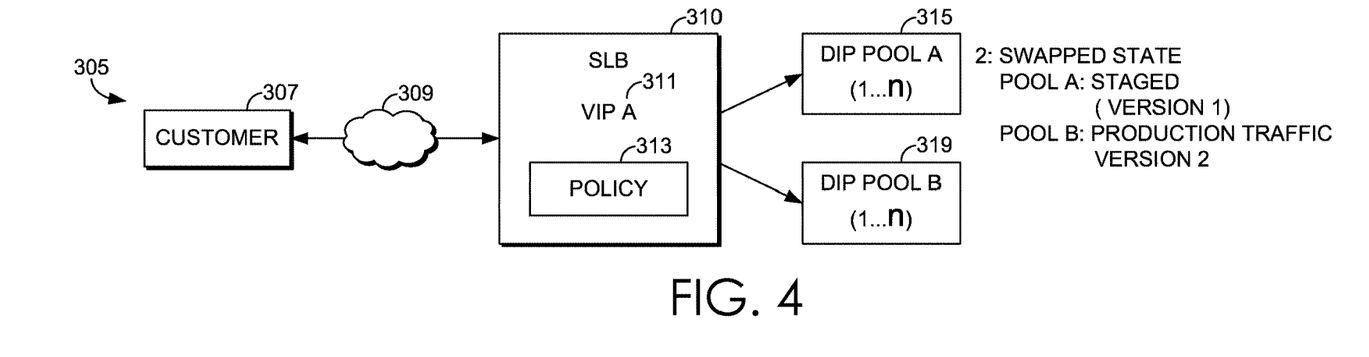
FIG. 4 is a schematic of an exemplary multi-pool framework, in accordance with aspects described herein.

Turning now to FIGS. 3 and 4, the transition of a service from testing to production behind a single VIP is illustrated, in accordance with an aspect of the technology described herein. The cloud computing environment 305 includes customers, such as customer 307, communicating with a data center over wide area network 309. In one aspect, the wide area network 309 is the Internet. Messages addressed to VIP A 311 are routed to load balancer 320. Load balancer 320 executes policy 312 to determine whether a request from customer 307 should be routed to DIP pool A 315 or DIP pool B 319. A DIP pool can have numerous endpoints. The endpoints can be physical machines or virtual machines.

Initially, DIP pool A 315 includes machines running a first version of a service in production mode. DIP pool B 319 includes machines running a second version of a service in testing mode. The policy 312 can route messages received from customers to either DIP pool A 315 or DIP pool B 319 according to testing parameters.

In FIG. 4, the updated policy causes the load balancer 320 to begin routing production traffic to DIP pool B 319. Now, DIP pool B 319 receives the production traffic, while traffic is phased away from DIP pool A 315. Some traffic may still be routed to DIP pool A 315, according to the policy. For example, when the service is state sensitive, ongoing support for a client may be provided by a first version of the service until a service session ends.

Figure 5:
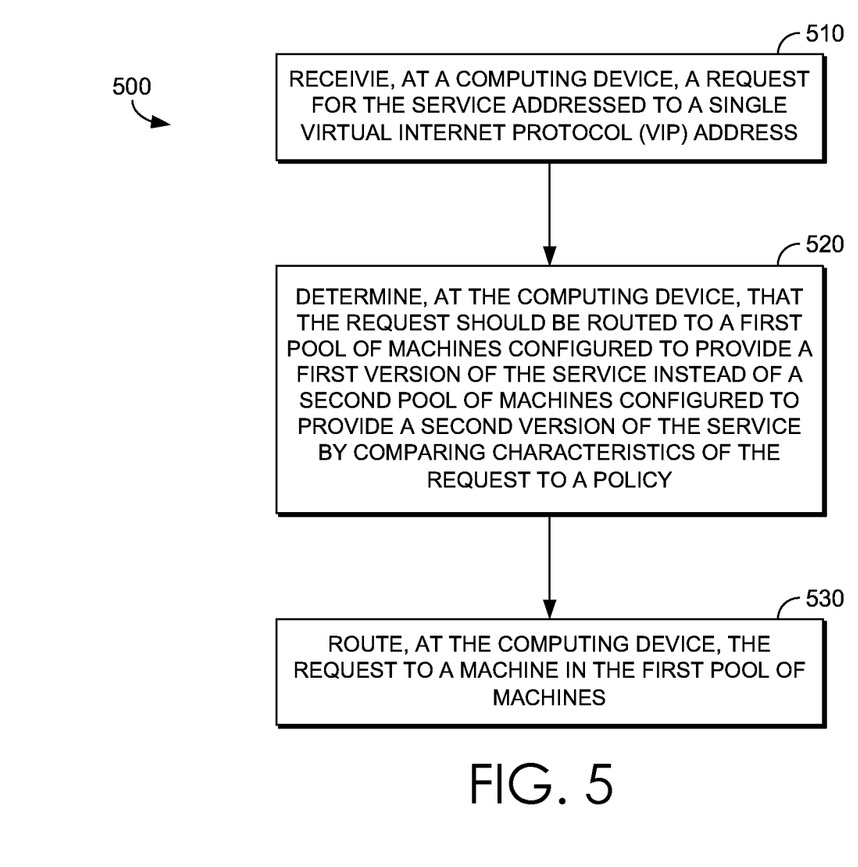
FIG. 5 is a flow diagram showing an exemplary method for deploying two different versions of a service simultaneously, in accordance with aspects described herein.

Turning now to FIG. 5, a method 500 for deploying two different versions of a service simultaneously is described. The service may be provided to a client device by one or more machines in a data center.

At step 510, a request for a service addressed to a single virtual Internet protocol (VIP) address is received by a computing device. The computing device may be a load balancer within a data center.

At step 520, a determination is made by the computing device that the request should be routed to a first pool of machines configured to provide a first version of the service instead of a second pool of machines configured to provide a second version of the service by comparing characteristics of the request to a policy. The machines may be virtual machines. The first pool of machines and the second pool of machines are available simultaneously so that a request could be sent to either pool.

At step 530, the computing device routes the request to a machine in the first pool. The machine then provides a first version of the service.

Figure 6:
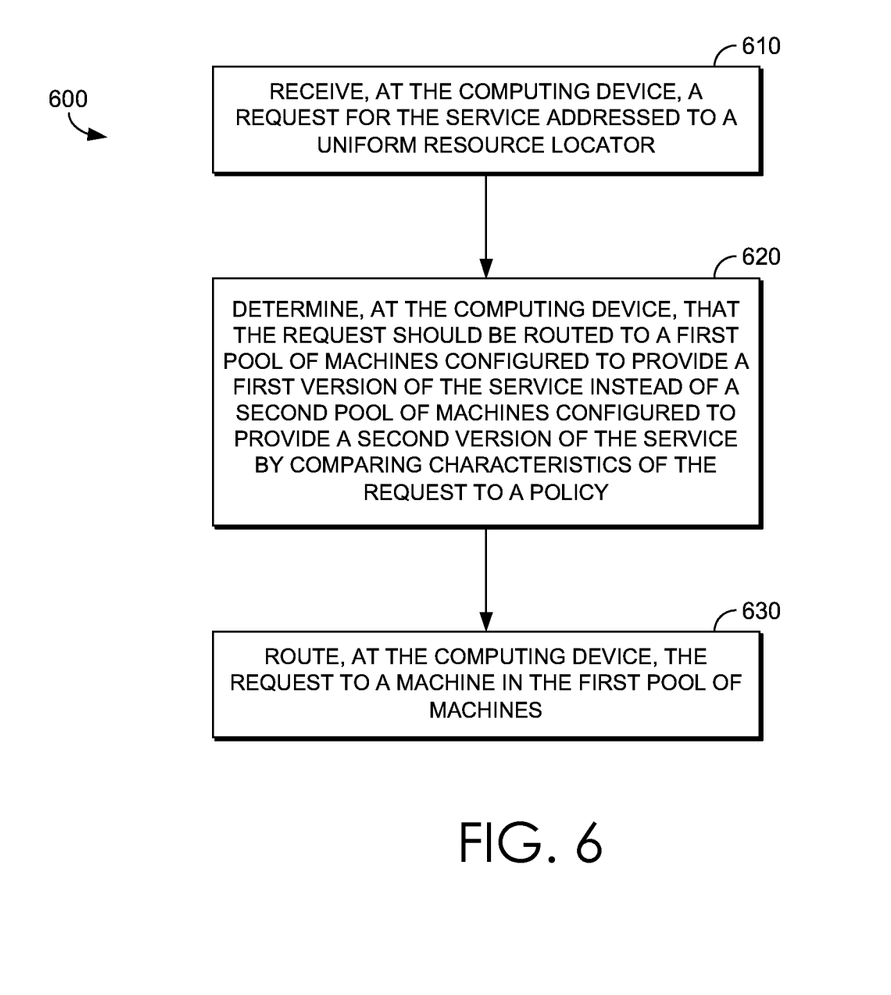
FIG. 6 is a flow diagram showing an exemplary method for deploying two different versions of a service simultaneously, in accordance with aspects described herein.

Turning now to FIG. 6, a method 600 for deploying two different versions of a service simultaneously is described. The service may be provided to a client device by one or more machines in a data center.

At step 610, a request for a service addressed to a single uniform resource locator (URL) is received by a computing device. The URL may be a VIP. The computing device may be a load balancer within a data center.

At step 620, a determination is made by the computing device that the request should be routed to a first pool of machines configured to provide a first version of the service instead of a second pool of machines configured to provide a second version of the service by comparing characteristics of the request to a policy. The machines may be virtual machines. The first pool of machines and the second pool of machines are available simultaneously so that a request could be sent to either pool.

At step 630, the computing device routes the request to a machine in the first pool. The machine then provides a first version of the service.

Having described an overview of aspects of the technology, an exemplary operating environment in which aspects described herein may be implemented is described below in order to provide a general context for various aspects of the technology described herein. Referring initially to FIG. 7 in particular, an exemplary operating environment for implementing aspects described herein is shown and designated generally as computing device 700. Computing device 700 is but one example of a suitable computing environment and is not intended to suggest any limitation as to the scope of use or functionality of the technology described herein. Neither should the computing device 700 be interpreted as having any dependency or requirement relating to any one or combination of components illustrated.

The technology described herein may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The technology described herein may be practiced in a variety of system configurations, including handheld devices, consumer electronics, general-purpose computers, more specialty computing devices, etc. The technology described herein may also be practiced in distributed computing environments where tasks are performed by remote-processing devices that are linked through a communications network.

Figure 7:
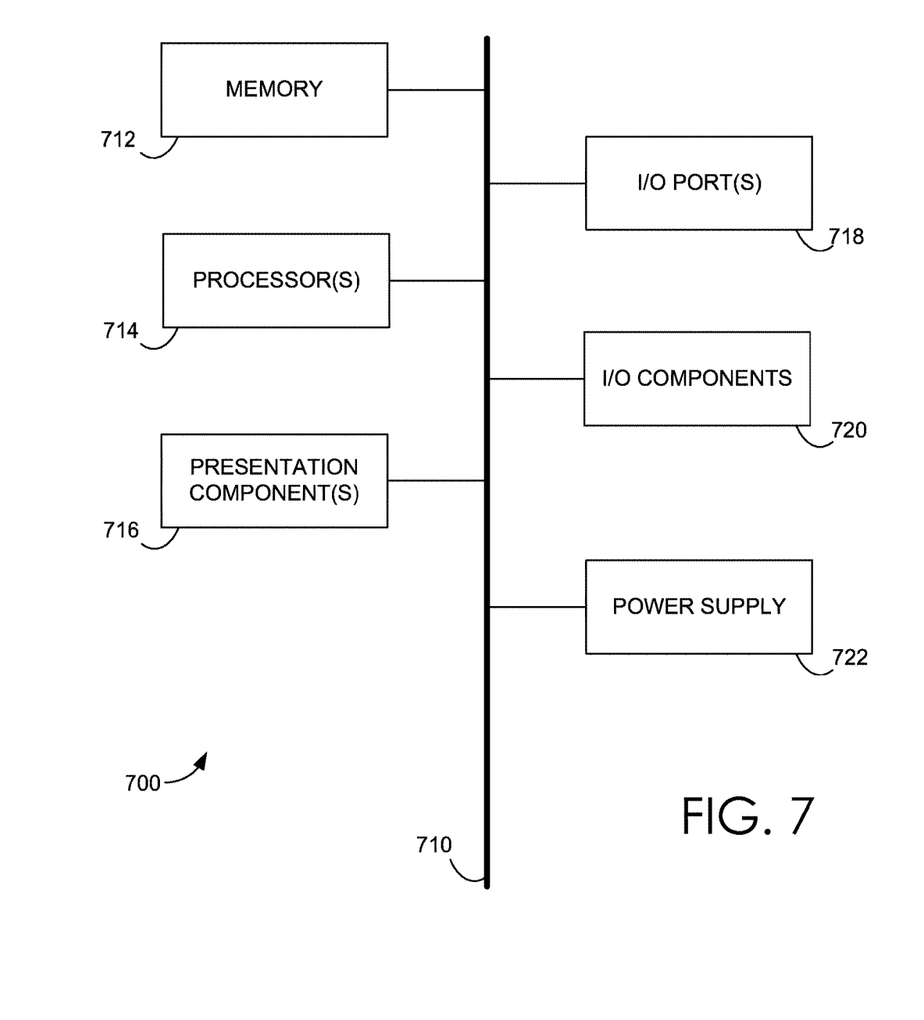
FIG. 7 is a block diagram of an exemplary computing environment suitable for use in implementing aspects described herein.

With reference to FIG. 7, computing device 700 includes a bus 710 that directly or indirectly couples the following devices: memory 712, one or more processors 714, one or more presentation components 716, input/output (I/O) ports 718, input/output (I/O) components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

EMBODIMENTS

Embodiment 1

A system having a processor, and storage media with computer-executable instructions embodied thereon that, when executed by the processor, performs a method for deploying a pool of computing devices from a staged environment to a production environment, the system comprising: a first pool of virtual machines configured to provide a first version of a service; a second pool of virtual machines configured to provide a second version of the service; and a load-balancing component configured to: 1) receive from a client device a request for the service addressed to a single virtual Internet protocol (VIP) address, and 2) apply a policy to route the consumer request to a virtual machine within either the first pool of virtual machines or the second pool of virtual machines.

Embodiment 2

The system of embodiment 1, where in the first pool of virtual machines comprises production machines and the second pool of virtual machines comprises testing machines.

Embodiment 3

The system of embodiment 2, wherein the policy causes the load-balancing component to route requests received from a testing service to the second pool of virtual machines.

Embodiment 4

The system of any of the above embodiments, wherein the load-balancing component is further configured to provide an application program interface through which a virtual machine can be assigned to either the first pool of virtual machines or the second pool of virtual machines.

Embodiment 5

The system of any of the above embodiments, wherein the policy routes a first percentage of requests to the first pool of virtual machines and a second percentage of requests to the second pool of virtual machines.

Embodiment 6

The system of any of the above embodiments, wherein the first pool of virtual machines, the second pool of virtual machines, and the load balancer are all components of a data center.

Embodiment 7

The system of any of the above embodiments, wherein a unique direct Internet protocol (DIP) address is assigned to each virtual machine in the first pool of virtual machines.

Embodiment 8

The system of any of the above embodiments, wherein the policy is updateable to change the second pool of virtual machines to a production pool.

Embodiment 9

The system of any of the above embodiments, wherein the request does not specify a specific virtual machine, the first pool of virtual machines, or the second pool of virtual machines.

Embodiment 10

A method for deploying two different versions of a service simultaneously, the method comprising: receiving, at a computing device, a request for the service addressed to a single virtual Internet protocol (VIP) address; determining, at the computing device, that the request should be routed to a first pool of machines configured to provide a first version of the service instead of a second pool of machines configured to provide a second version of the service by comparing characteristics of the request to a policy, wherein both the first pool of machines and the second pool of machines are available simultaneously; and routing, at the computing device, the request to a machine in the first pool of machines.

Embodiment 11

The method of embodiment 10, wherein the first version of the service is a staged version and the second version of the service is a production version.

Embodiment 12

The method of embodiment 11, wherein the method further comprises: receiving an updated policy that changes the first version of the service to the production version.

Embodiment 13

The method of embodiment 12, wherein the first pool of machines and the second pool of machines are located in one or more data centers.

Embodiment 14

The method of claim 10, wherein the method further comprises: receiving an indication that a new virtual machine is assigned to the second pool of machines; and storing a record that the new virtual machine is in the second pool of machines.

Embodiment 15

The method of any of claims 10-14, wherein the machine is a virtual machine.

Embodiment 16

A computer storage media having computer-executable instructions embodied thereon that, when executed by a computing device, perform a method for deploying two different versions of a service simultaneously, the method comprising: receiving, at the computing device, a request for the service addressed to a uniform resource locator; determining, at the computing device, that the request should be routed to a first pool of machines configured to provide a first version of the service instead of a second pool of machines configured to provide a second version of the service by comparing characteristics of the request to a policy, wherein both the first pool of machines and the second pool of machines are available simultaneously; and routing, at the computing device, the request to a machine in the first pool of machines.

Embodiment 17

The media of embodiment 16, wherein the method further comprises: receiving an indication that a new machine is assigned to the second pool; and storing a record that the new machine is in the second pool.

Embodiment 18

The media of any of embodiment 16 or 17, wherein the policy specifies that a designated percentage of requests are sent to the first pool of machines.

Embodiment 19

The media of any of embodiment 16, 17, or 18, wherein the policy specifies a request characteristic used to associate the request with the first pool of machines.

Embodiment 20

The media of any of embodiment 16, 17, 18, or 19, wherein the first version of the service is a staged version and the second version of the service is a production version.

Aspects presented herein have been described in relation to particular aspects which are intended in all respects to be illustrative rather than restrictive. It will be understood that certain features and sub-combinations are of utility and may be employed without reference to other features or sub-combinations. This is contemplated by and is within the scope of the claims.

What is claimed is:

1. A system having a processor, and storage media with computer-executable instructions embodied thereon that, when executed by the processor, performs a method for deploying a pool of computing devices from a staged environment to a production environment, the system comprising:
    a first pool of two or more virtual machines associated with a single virtual Internet protocol address configured to provide a first version of a service;
    a second pool of two or more virtual machines associated with the single virtual Internet protocol address configured to provide a second version of the service,
    wherein the first pool of two or more virtual machines running the first version of a service and the second pool of two or more virtual machines running the second version of the service are simultaneously active to receive a request; and
    a load-balancing component configured to:
    1) receive from a client device a request for the service addressed to the single virtual Internet protocol address,
    2) apply a routing policy that facilitates a testing of the second version of the service running on the second pool of two or more virtual machines, and
    3) based on the routing policy, route the request to the second pool of two or more machines.

2. The system of claim 1, wherein the first pool of two or more virtual machines comprises production machines and the second pool of two or more virtual machines comprises testing machines.

3. The system of claim 2, wherein the routing policy causes the load-balancing component to route requests received from a testing service to the second pool of two or more virtual machines.

4. The system of claim 1, wherein the load-balancing component is further configured to provide an application program interface through which a virtual machine can be assigned to either the first pool of two or more virtual machines or the second pool of two or more virtual machines.

5. The system of claim 1, wherein the routing policy routes a first percentage of requests to the first pool of two or more virtual machines and a second percentage of requests to the second pool of two or more virtual machines.

6. The system of claim 1, wherein the first pool of two or more virtual machines, the second pool of two or more virtual machines, and the load balancer are all components of a data center.

7. The system of claim 1, wherein a unique direct Internet protocol (DIP) address is assigned to each virtual machine in the first pool of two or more virtual machines.

8. The system of claim 1, wherein the routing policy is updateable to change the second pool of two or more virtual machines to a production pool.

9. The system of claim 1, wherein the request does not specify a specific virtual machine, the first pool of two or more virtual machines, or the second pool of two or more virtual machines.

10. A method for deploying two different versions of a service simultaneously, the method comprising:
    receiving, at a computing device, a request for the service addressed to a single virtual Internet protocol (VIP) address;
    determining, at the computing device, that the request should be routed to a second pool of two or more virtual machines configured to provide a second version of the service instead of a first pool of two or more virtual machines configured to provide a first version of the service by comparing characteristics of the request to a routing policy to test the second version of the service running on the second pool of two or more virtual machines, wherein both the first pool of two or more virtual machines and the second pool of two or more virtual machines are available simultaneously; and
    routing, at the computing device, the request to a machine in the second pool of two or more virtual machines.

11. The method of claim 10, wherein the second version of the service is a staged version and the first version of the service is a production version.

12. The method of claim 11, wherein the method further comprises:
    receiving an updated policy that changes the second version of the service to the production version.

13. The method of claim 12, wherein the first pool of two or more machines and the second pool of two or more machines are located in one or more data centers.

14. The method of claim 10, wherein the method further comprises:
    receiving an indication that a new virtual machine is assigned to the second pool of two or more machines; and storing a record that the new virtual machine is in the second pool of two or more machines.

15. The method of claim 10, wherein the machine is a virtual machine.

16. A computer storage media having computer-executable instructions embodied thereon that, when executed by a computing device, perform a method for deploying two different versions of a service simultaneously, the method comprising:
receiving, at the computing device, a request for the service addressed to a uniform resource locator;
determining, at the computing device, that the request should be routed to a second pool of two or more virtual machines configured to provide a second version of the service instead of a first pool of two or more virtual machines configured to provide a first version of the service by comparing characteristics of the request to a routing policy to transitionally rollout the second version of the service running on the second pool of two or more virtual machines, wherein both the first pool of two or more machines and the second pool of two or more virtual machines are available simultaneously; and
routing, at the computing device, the request to a machine in the second pool of two or more machines.

17. The media of claim 16, wherein the method further comprises:
receiving an indication that a new machine is assigned to the second pool; and
storing a record that the new machine is in the second pool.

18. The media of claim 16, wherein the routing policy specifies that a designated percentage of requests are sent to the second pool of two or more machines.

19. The media of claim 16, wherein the routing policy specifies a request characteristic used to associate the request with the first pool of two or more machines.

20. The media of claim 16, wherein the first version of the service is a staged version and the second version of the service is a production version.

* * * * *